July 22, 1969  R. NOACK ETAL  3,456,568
PHOTOGRAPHIC SHUTTER WITH SPRING-DRIVEN BLADE
Filed Nov. 21, 1966  2 Sheets-Sheet 1

INVENTORS
ROLF NOACK
JOHANNES WEISE
WOLFGANG RIEDEL
BY Young & Thompson
ATTYS.

INVENTORS
ROLF NOACK
JOHANNES WEISE
WOLFGANG RIEDEL
BY Young & Thompson
ATTYS

United States Patent Office 3,456,568
Patented July 22, 1969

3,456,568
PHOTOGRAPHIC SHUTTER WITH SPRING-DRIVEN BLADE
Rolf Noack, Johannes Weise, and Wolfgang Riedel, Dresden, Germany, assignors to VEB Pantacon Dresden Kamera- und Kinowerke, Dresden, Germany
Filed Nov. 21, 1966, Ser. No. 595,842
Int. Cl. G03b 9/26
U.S. Cl. 95—60                                      3 Claims

ABSTRACT OF THE DISCLOSURE

The photographic shutter is provided with a pair of rotatable blades which successively open and close respectively the image aperture at a predetermined interval. The blades are braked by brake means in the paths of movement of the blades. The brake means are movable out of the paths, to enable the blades to be cocked without hindrance, by a pair of dogs extending from a spring-driven shifting ring which is released by mechanism driving the shutter blades so as to render the brake means inoperative after exposure has taken place.

Background to the invention

The invention relates to a photographic shutter having at least one spring-driven blade which is brought to a halt on reaching its end position by a brake which is non-displaceably mounted and can be set out of operation when the shutter mechanism is in the rest position.

With the parent patent application such a device has already been proposed, where the brake is formed as a directing device for the blade. While the blade is braked in its return into the rest position, during the cocking operation it slides over the brake without hindrance. However, with this proposed measure there is the danger that in the case of excessive brake pressure the brake may halt under the brake even before reaching its end position, so that the brake effect is not removed, or in the case of inadequate brake pressure impact phenomena may still occur; therefore additional adjustment measures are necessary.

The problem of the invention is the avoidance of the above disadvantages by the provision of a device independent of the brake pressure, which sets the brake out of action after termination of the exposure operation.

Summary of invention

According to the invention this is achieved due to the fact that there is provided a shifting ring actuating the brake, which ring in the cocking of the shutter is pivotable against a shift spring into a control position setting the brake in action and securable by a pawl, and after the release of the shutter is releasable by a shift arm which returns into the rest position later than the blades, and thus is returnable into a control position setting the brake out of action. The shifting ring is expediently provided with at least one dog by which the brake is liftable away from the blades, while the shift arm which operates the pawl in the direction of release of the shifting ring is arranged on the closing lever of the shutter mechanism. The details of the invention may be seen from an illustrated and described example of embodiment.

Description of preferred embodiment

Figure 1:
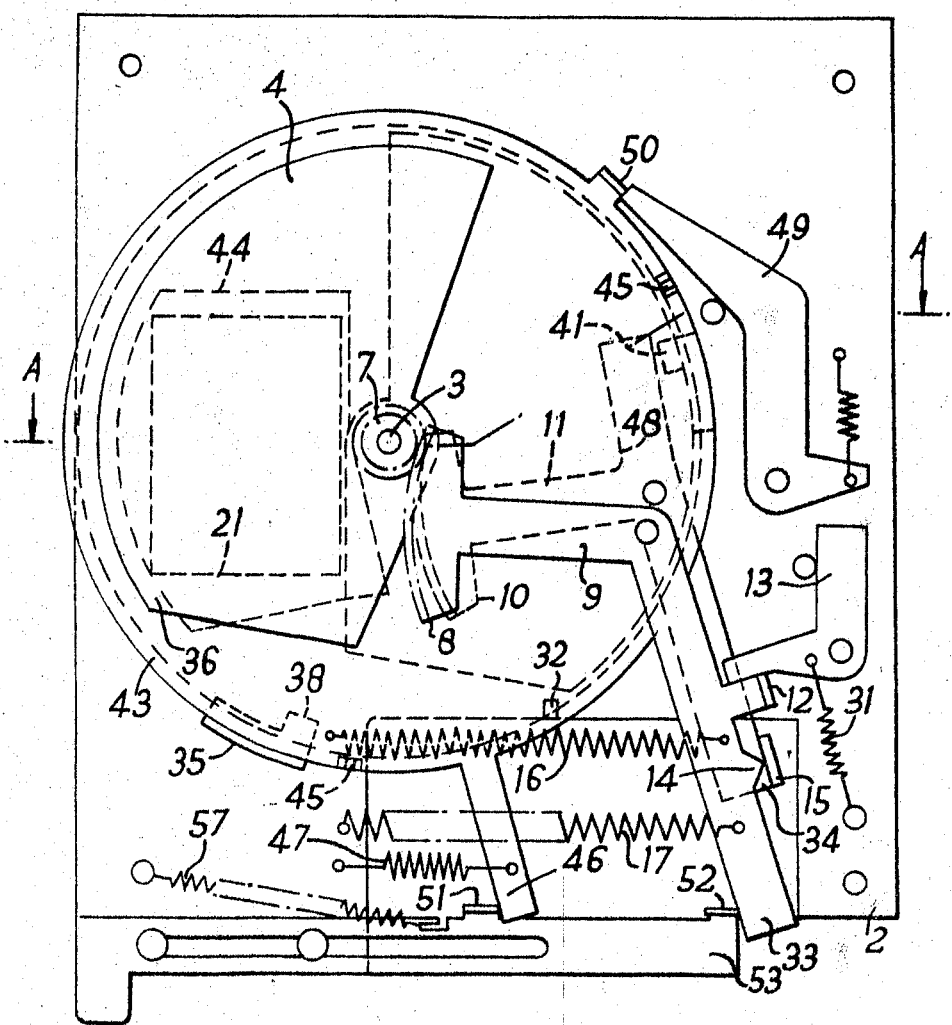
FIGURE 1 shows the shutter in the cocked position.

Between the plates 1 and 2 the opening blade 4 and the closing blade 5 are rotatably mounted about the spindle 3. The pinion 6 is rigidly connected with the opening blade 4 and the pinion 7 is rigidly connected with the closing blade 5. The toothed segment arm 8 of the opening lever 9 meshes with the pinion 6 and the toothed segment arm 10 of the closing lever 11 is in engagement with the pinion 7. The opening lever 9 has a catch lug 12 which can be grasped by the release lever 13. Furthermore the opening lever 9 possesses a nose 14, in the path of which there is arranged a coupling lug 15 of the closing lever 11. Moreover on the opening lever 9 there is secured the opening spring 16 and on the closing lever 11 the closing spring 17. Between the opening blade 4 and the closing blade 5 the shifting ring 43 lies rotatably, which possesses a circular aperture 44 and shift dogs 45. On the cocking arm 46 of the shifting ring 43 there is attached the shift spring 47, which endeavours to rotate the shift dogs 45 in the counter-clockwise direction to beneath the resilient brake lugs 38 and 41. The pawl 49 holds the shifting ring 43, against the shift spring 47, by means of the blocking nose 50. Into the plates 1 and 2 there are cut picture windows 20 and 21 aligned with one another. On the closing lever 11 there is provided a shift arm 48, in the path of which there is arranged the pawl 49.

The brake lugs 38 and 41 of the brake springs 35 and 40 secured on the plates 1 and 2 are arranged in the path of the running-off blades 4 and 5. The cocking arm 46 and the drive arm 33 are graspable by lugs 51 and 52 of a common cocking slider 53, which is loaded by a return spring 57.

Figure 2:
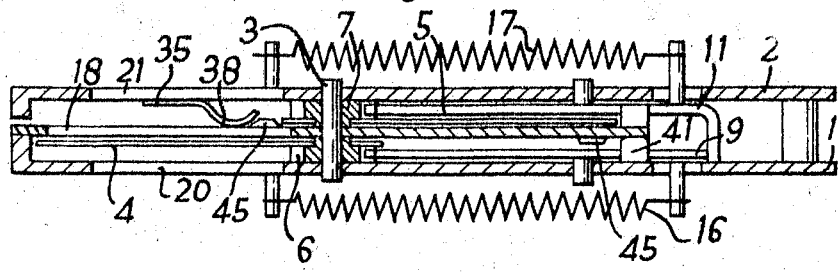
FIGURE 2 shows the section along the line A—A.
Figure 3:
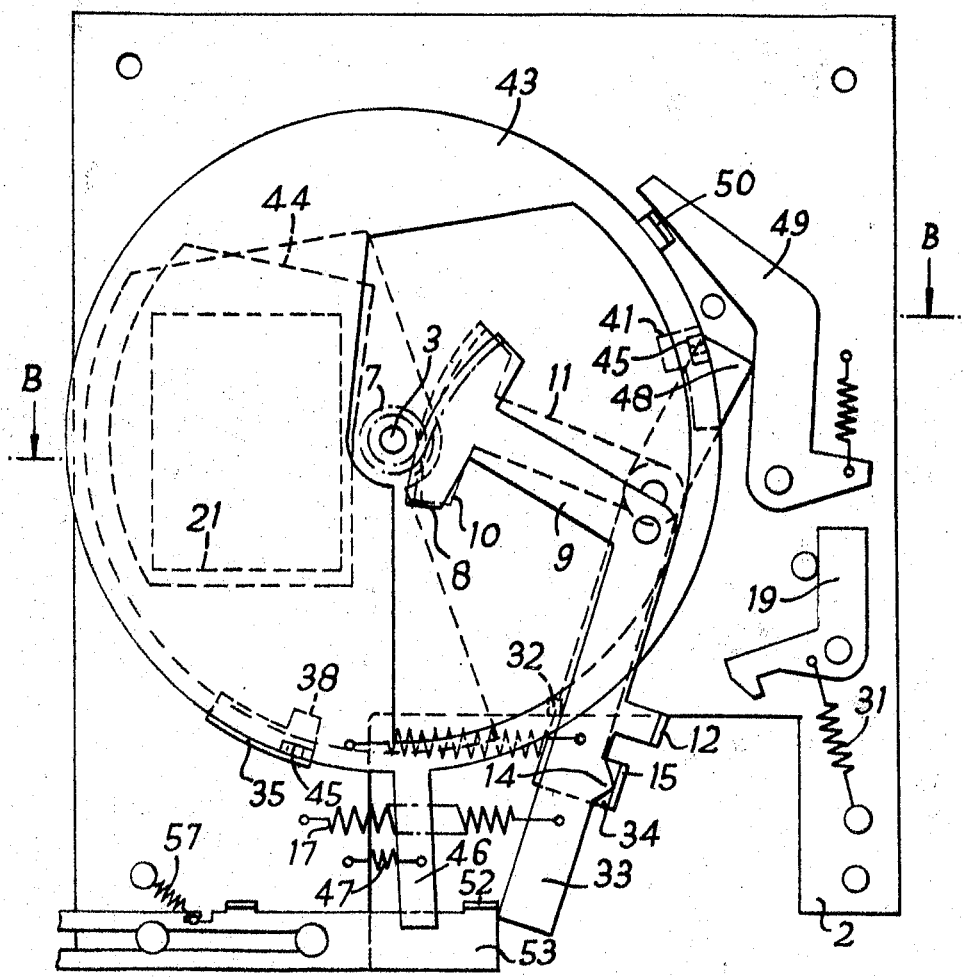
FIGURE 3 shows the shutter in the rest position.
Figure 4:
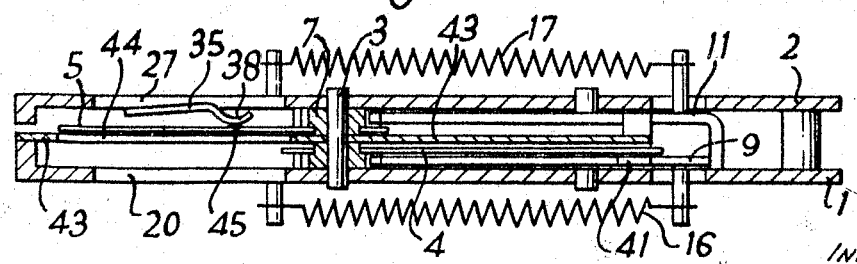
FIGURE 4 shows the section along the line B—B.

The manner of operation of the shutter mechanism is as follows:

When the shutter is cocked the individual components assume positions according to FIGURES 1 and 2. The cocking slider 53 returns into its rest position according to FIGURE 3 immediately after the cocking operation, as a result of the return spring 57. If the release lever 13 is actuated against its spring 31, the opening spring 16 and the closing spring 17 can then rotate the opening lever 9 and the closing lever 11 in the clockwise direction. Through the segment arm 8 the opening lever 9 drives the opening blade 4 in the counter-clockwise direction, so that the opening blade 4 springs out of the region of the picture windows 20 and 21. Before return into the rest position the opening blade 4 reaches the brake lug 41, which halts the opening blade 4. The running off of the closing lever 11 is delayed in known manner according to the measure of a pre-set escapement. Then the closing spring 17 permits the closing lever 11 with the closing blade 5 to follow the opening blade 4: the latter comes to a halt after the coincidence of the picture windows 20 and 21. Before the rest position is reached, the closing blade 5 reaches the brake lug 38 and is halted. In the last part of its running-off path the shift arm 48 strikes upon the pawl 49 and rotates the latter in the clockwise direction, so that the shifting ring 43 is released. The shift spring 47 can consequently rotate the shifting ring 43 in the clockwise direction. The shift dogs 45 then reach the brake lugs 38 and 41, which are lifted away from the opening blade 5 and from the closing blade 4 respectively. The brake is thus put out of action.

For the cocking of the shutter firstly the drive arm 33 of the opening lever 9 is rotated in the counter-clockwise direction through the cocking slider 53, against the return spring 57. Through the nose 14 the drive arm 34 of the closing lever 11 is grasped by the coupling lug 15 and also rotated in the counter-clockwise direction. In the last part of the cocking travel the lug 51 of the cocking slider 53 strikes upon the cocking arm 46 of the shifting ring 43 and rotates the latter in the counter-clockwise direction against the shift spring 47, the shift dogs 45 bringing the brake lugs 38 and 41 into the path of the closing blade 5 and of the opening blade 4 respectively. The brake is thus set in action.

We claim:

1. In a photographic shutter having rotatable opening and closing blades and a blade driving mechanism which causes the blades successively to open and close respectively, an image aperture at a time interval determinable by an escapement mechanism in connection with said driving mechanism, said blades being movable between cocked and rest positions, and having brake means provided in the path of said blades in the region of their rest positions, the provisions of:

(a) a spring-driven rotatable shifting ring movable into a cocked position by the cocking of the shutter and into a rest position under the influence of its spring, (b) a pawl for holding said shifting ring in its cocked position, (c) means on said shifting ring for engaging said brakes and rendering them inoperational with the shifting ring in its rest position, and (d) a shift arm movable with said blade driving mechanism and engageable with said pawl to effect release of the shifting ring at the end of the running down movement of the blades.

2. A photographic shutter according to claim 1, wherein the blade driving mechanism comprises pinions respectively attached to the shutter blades, and a pair of spring-driven levers having toothed segments engaging with said pinion, and wherein said shift arm is formed as an extension of the lever which drives the aperture closing blade.

3. A photographic shutter according to claim 1, wherein the means on the shifting ring are two shift dogs which engage the brake means and move the latter out of the path of movement of the blades when the shifting ring is in its rest position.

References Cited

UNITED STATES PATENTS 3,374,722   3/1968   Noack et al. _____ 95—60

NORTON ANSHER, Primary Examiner

DAVID B. WEBSTER, Assistant Examiner